US009404663B2

(12) United States Patent
Jeon et al.

(10) Patent No.: US 9,404,663 B2
(45) Date of Patent: Aug. 2, 2016

(54) HIGH TEMPERATURE VACUUM INSULATION PANEL

(71) Applicant: LG Hausys, Ltd., Seoul (KR)

(72) Inventors: Seung-Min Jeon, Busan (KR); Sung-Seock Hwang, Cheongju-si (KR); Jung-Pil Han, Ulsan (KR); Byung-Hoon Min, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 27 days.

(21) Appl. No.: 14/359,200

(22) PCT Filed: Nov. 29, 2012

(86) PCT No.: PCT/KR2012/010245

§ 371 (c)(1),
(2) Date: May 19, 2014

(87) PCT Pub. No.: WO2013/081395

PCT Pub. Date: Jun. 6, 2013

(65) Prior Publication Data

US 2014/0322477 A1 Oct. 30, 2014

(30) Foreign Application Priority Data

Dec. 2, 2011 (KR) ........................ 10-2011-0128566

(51) Int. Cl.
*F16L 59/065* (2006.01)
*F24C 15/34* (2006.01)
(Continued)

(52) U.S. Cl.
CPC . *F24C 15/34* (2013.01); *F24B 1/24* (2013.01); *H05B 6/6402* (2013.01); *Y10T 428/239* (2015.01)

(58) Field of Classification Search
CPC ........ F16L 59/605; E04B 1/803; Y02B 80/12
USPC ............................................................ 428/69
See application file for complete search history.

(56) References Cited

U.S. PATENT DOCUMENTS

2001/0008671 A1 7/2001 Kuroda et al.
2005/0287370 A1* 12/2005 Kaczmarek ............. B32B 27/32 428/411.1
2006/0159436 A1* 7/2006 Yuasa .................. F16L 59/065 392/459

FOREIGN PATENT DOCUMENTS

EP 1607217 A1 12/2005
EP 1640148 A1 3/2006
(Continued)

OTHER PUBLICATIONS

Japanese Office Action dated May 29, 2015 in connection with the counterpart Japanese Patent Application No. 2014-544667.
(Continued)

*Primary Examiner* — Alexander Thomas
(74) *Attorney, Agent, or Firm* — Hauptman Ham, LLP

(57) ABSTRACT

The present invention relates to a vacuum insulation panel comprising a core material, and a shell material, and more specifically, to a high temperature vacuum insulation panel usable in a high temperature range. The present invention provides a high temperature vacuum insulation panel including: an inorganic core material comprising glass fiber; and a shell material for sealing the inorganic core material in which the shell material comprises a composite film including a thermal deposition layer adhered to the surface of the inorganic core material, a protective layer for absorbing and dispersing external impact, and a barrier layer for blocking the permeation of gas or moisture between the thermal deposition layer and the protective layer.

19 Claims, 2 Drawing Sheets

(51) Int. Cl.
*F24B 1/24* (2006.01)
*H05B 6/64* (2006.01)

(56) References Cited

FOREIGN PATENT DOCUMENTS

| | | | |
|---|---|---|---|
| JP | 2000013952 | A | 1/2000 |
| JP | 2000343634 | A | 12/2000 |
| JP | 2002048466 | A | 2/2002 |
| JP | 2003119392 | A | 4/2003 |
| JP | 2005106312 | A | 4/2005 |
| JP | 2005121704 | A | 5/2005 |
| JP | 2005344900 | A | 12/2005 |
| JP | 2006077799 | A | 3/2006 |
| JP | 2007138976 | A | 6/2007 |
| JP | 2010060048 | A | 3/2010 |
| JP | 2011005693 | A | 1/2011 |
| JP | 2011102622 | A | 5/2011 |
| JP | 2011241988 | A | 12/2011 |
| KR | 20050115291 | A | 12/2005 |
| KR | 100950834 | B1 | 4/2010 |
| KR | 20110072795 | A | 6/2011 |
| KR | 20110101786 | A | 9/2011 |
| TW | 200524733 | A | 8/2005 |
| WO | 2011019394 | A1 | 2/2011 |
| WO | 2011068148 | A1 | 6/2011 |
| WO | 2011133778 | A2 | 10/2011 |

OTHER PUBLICATIONS

European Search Report dated Jul. 13, 2015 in connection with the counterpart European Patent Application No. 12852869.2.

International Search Report for PCT/KR2012/010245 mailed on Mar. 18, 2013.

Japanese Office Action dated Jan. 15, 2016 in connection with the counterpart Japanese Patent Application No. 2014-544667.

Taiwanese Office Action dated Mar. 25, 2016 in connection with the counterpart Taiwanese Patent Application No. 101145329.

European Office Action dated on Jun. 9, 2016 corresponding to European Application No. 128528692.

* cited by examiner

HIGH TEMPERATURE VACUUM INSULATION PANEL

TECHNICAL FIELD

The present invention relates to a vacuum heat insulator including a core and a shell, and more particularly, to a high temperature vacuum heat insulator which can be used at high temperatures.

BACKGROUND ART

In Korea, although an inorganic heat insulator allowing easy handling and having flame retardancy, such as glass wools and the like, is used as a heat insulator in high temperature conditions, such as water purifiers and the like, the inorganic heat insulator has many problems in improvement of power consumption efficiency due to insufficient heat insulation properties.

Recently, a vacuum heat insulator for use at high temperatures has also been developed. As a representative example, efforts are focused on development of a vacuum heat insulator in terms of improvement in long-term performance rather than good initial performance by minimizing heat transfer in the vacuum heat insulator using a porous inorganic material such as fumed silica as a core.

However, for fundamental improvement of performance of the vacuum heat insulator, it is necessary to solve problems relating to impartment of heat resistance and flame retardancy to a shell, and increase in inner pressure of the vacuum heat insulator due to external gas and water vapor.

For high temperature electronic appliances, such as electric pots, microwave ovens and the like, although the vacuum heat insulator is prepared using, for example, a heat resistant structure of the shell and properties of a getter, there are problems such as low long-term performance, non-flame retardancy, and high manufacturing costs.

In high temperature conditions, the vacuum heat insulator can suffer from severe deterioration in long-term heat insulation properties and barrier properties of the shell.

Thus, to use the vacuum heat insulator at high temperatures, there is a need for a heat resistant shell film structure capable of minimizing deterioration in barrier properties of the shell, and a getter material capable of adsorbing large amounts of gas and water vapor flowing into the vacuum heat insulator in the high temperature conditions.

In particular, to use the vacuum heat insulator in electronic appliances, it is necessary for the vacuum heat insulator to exhibit flame retardancy and self-extinguishability.

DISCLOSURE

Technical Problem

It is an aspect of the present invention to provide a high temperature vacuum heat insulator capable of being continuously used at high temperatures.

It is another aspect of the present invention to provide a high temperature vacuum heat insulator exhibiting excellent flame retardancy in high temperature conditions.

Technical Solution

In accordance with one aspect of the present invention, a high temperature vacuum heat insulator includes: an inorganic core including glass fibers; and a shell including a composite film and sealing the inorganic core, which includes a heat-fusing layer brought into close contact with a surface of the inorganic core, a protective layer absorbing and distributing external impact, and a barrier layer blocking permeation of gas or moisture and being located between the heat-fusing layer and the protective layer.

The shell may further include at least one flame retardant selected from phosphorus compounds, nitrogen compounds, aluminum hydroxide, and antimony trioxide.

In one embodiment, the shell may further include a flame retardant layer formed by coating a composition including 10% by weight (wt %) to 90 wt % of at least one flame retardant selected from phosphorus compounds, nitrogen compounds, aluminum hydroxide and antimony trioxide, and 10 wt % to 90 wt % of a polymeric resin and an organic solvent, onto an outer surface of the protective layer.

In another embodiment, the shell may further include a flame retardant layer formed by coating a composition including 5 wt % to 50 wt % of a phosphorus compound, 5 wt % to 50 wt % of a nitrogen compound and 40 wt % to 90 wt % of a polymeric resin and an organic solvent, onto an outer surface of the protective layer.

The inorganic core may include: at least one plate-shaped board stacked therein, which is prepared from glass fibers by thermal compression of the glass fibers being subjected and stirred in water or an aqueous solution comprising an organic compound; at least one plate-shaped board stacked therein, which includes an inorganic binder including a glass fiber aggregate having a diameter of 1 μm to 10 μm and silica; or at least one plate-shaped mat stacked therein, which is prepared through needling treatment of glass wools.

The vacuum heat insulator may further include a getter inserted into an inner space sealed by the shell.

Advantageous Effects

According to the present invention, the vacuum heat insulator may be applied to electronic appliances in order to realize individually or simultaneously realize flame retardancy and heat insulation properties in high temperature conditions. Further, it is easy to widely apply the vacuum heat insulator to many fields, such as building interior/exterior materials, electronic appliances, transportation vehicles, industrial apparatuses, and the like. In particular, the vacuum heat insulator may be applied to purposes requiring flame retardancy and heat insulation properties, such as heat-retaining tanks (heat-retaining water suppliers) which perform rapid heating and rapid cooling of water and can preserve heat inside purifiers, vending machines, and the like.

According to the present invention, the high temperature vacuum heat insulator has a thermal conductivity of 0.01 W/mK or less, and when two sides of a hot water storage tank are thermally insulated using the vacuum heat insulator, power consumption is improved by about 10% or more. In addition, when five sides of the hot water storage tank are thermally insulated using the vacuum heat insulator, power consumption is improved by about 25% or more.

BEST MODE

Figure 1:
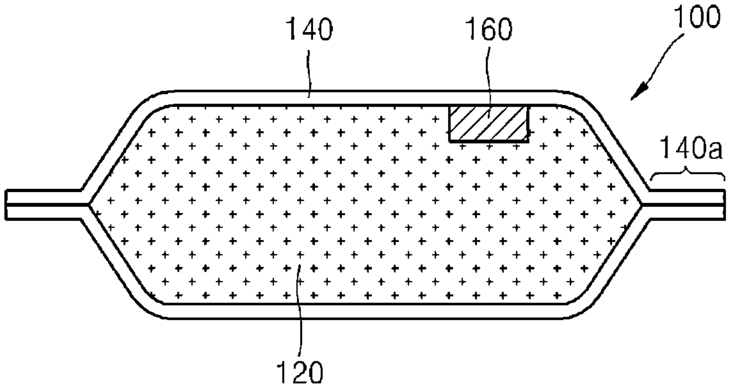
FIG. 1 is a sectional view of a high temperature vacuum heat insulator according to one embodiment of the present invention.

FIG. 1 is a sectional view of a high temperature vacuum heat insulator according to one embodiment of the present invention.

As shown in FIG. 1, a high temperature vacuum heat insulator 100 includes: an inorganic core 120 including glass fibers; and a shell 140 sealing the inorganic core.

In addition, to remove moisture of an inner space sealed by the shell 140, a getter 160 may be inserted into the space sealed by the shell 140.

The shell includes various functional layers, and may be formed of a composite film. The functional layers include a heat-fusing layer for securing adhesion to a surface of the inorganic core, a protective layer absorbing and distributing external impact, a barrier layer blocking permeation of gas or moisture, and a flame retardant layer for securing flame retardancy.

According to the invention, the inorganic core 120 of the high temperature vacuum heat insulator 100 may be any core known in the art without limitation so long as the core includes glass fibers as a primary component.

The inorganic core 120 may be formed by stacking at least one plate-shaped board, which is prepared by stirring glass fibers in water or an aqueous solution including an organic compound, and being followed by thermal compression, or by stacking at least one plate-shaped board, which includes an inorganic binder including a glass fiber aggregate having a diameter of 1 μm to 10 μm and silica, or at least one plate-shaped mat, which is prepared by needling treatment of glass wools and is stacked therein.

Alternatively, the inorganic core 120 may be formed by stacking at least one plate-shaped mat, which is prepared through needling treatment of glass wools. The mat may have a density of 100 $g/mm^3$ to 300 $g/mm^3$. If the mat has a density of less than 100 $g/mm^3$, it is difficult for the vacuum heat insulator to secure sufficient heat insulation properties, and if the mat has a density of greater than 300 g/mm3, there are drawbacks in that handling of the mat is not easy, and that the vacuum heat insulator can be deteriorated in bendability and the like.

According to the invention, the high temperature vacuum heat insulator 100 may include a getter 160 for absorbing moisture of the inner space accommodating the inorganic core 120. The getter 160 may be attached to the inorganic core 120, or be inserted into an inner space thereof.

The shell 140 has a form of the composite film including functional layers stacked therein. A structure of the shell 140 will be described below.

The getter 160 may include quicklime (CaO) powder having a purity of 95% or more, and include at least one selected from zeolite, cobalt, lithium, activated carbon, aluminum oxide, barium, calcium chloride, magnesium oxide, magnesium chloride, iron oxide, zinc, and zirconium.

With the inorganic core 120 and the getter 160 inserted into the shell 140, the shell 140 is subjected to decompression, followed by sealing a heat-fusing portion 140*a* of the shell 140, thereby preparing the high temperature vacuum heat insulator 100. The prepared high temperature vacuum heat insulator 100 is folded such that the heat-fusing portion 140*a* corresponds to an outer surface of the inorganic core 120, and then used.

When the vacuum heat insulator according to the invention is prepared in a thin film type insulator having a thickness of 3 mm or less and then applied to electronic appliances and the like, the heat-fusing portion 140*a* may have a width of 6 mm to 15 mm.

Figure 2:
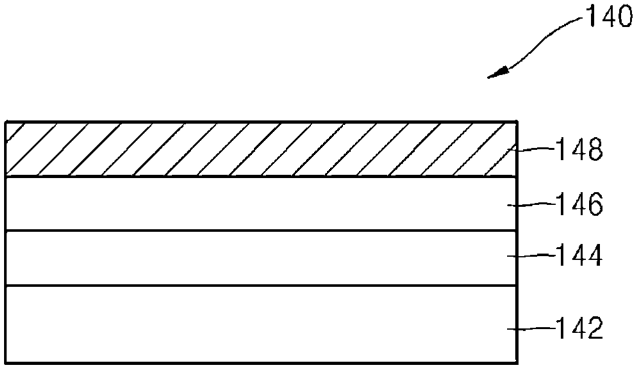
FIG. 2 is a sectional view of a shell of a high temperature vacuum heat insulator according to the embodiment of the present invention.
Figure 3:
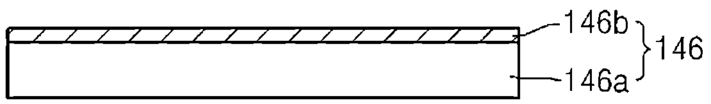
FIG. 3 is a sectional view of a protective layer of the shell of the high temperature vacuum heat insulator according to the embodiment of the present invention.
Figure 4:
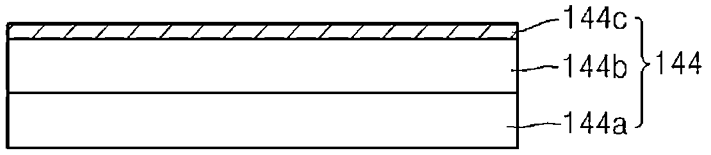
FIG. 4 is a sectional view of a barrier layer of the shell of the high temperature vacuum heat insulator according to the embodiment of the present invention.

FIG. 2 is a sectional view of a shell of a high temperature vacuum heat insulator according to the embodiment, FIG. 3 is a sectional view of a protective layer of the shell of the high temperature vacuum heat insulator according to the embodiment, and FIG. 4 is a sectional view of a barrier layer of the shell of the high temperature vacuum heat insulator according to the embodiment.

The shell 140 formed of the composite film includes a heat-fusing layer 142, a barrier layer 144, a protective layer 146, and a flame retardant layer 148 from a bottom thereof contacting the inorganic core.

Hereinafter, the term "upper side" means a surface facing an outside of the high temperature vacuum heat insulator, and the term "lower side" means an inner surface facing the inorganic core of the vacuum heat insulator.

Heat-Fusing Layer 142

The heat-fusing layer 142 is bonded to a lower side of the barrier layer 144 and brought into close contact with the surface of the inorganic core (120 in FIG. 1) of the high temperature vacuum heat insulator.

The heat-fusing layer 142 may be formed of a film including at least one of linear low-density polyethylene (LLDPE), low density polyethylene (LDPE), high density polyethylene (HDPE), casting polypropylene (CPP), and the like, which can facilitate fusing of the heat-fusing portion (140*a* in FIG. 1) and exhibit excellent sealing properties. In addition, these materials may be used alone or in combination thereof.

The heat-fusing layer 142 may have a thickness of 50 μm to 80 μm. If the heat-fusing layer 142 has a thickness of less than 50 μm, the heat-fusing layer 142 can be deteriorated in peel strength and thus does not act as a heat-fusing layer, and if the heat-fusing layer 142 has a thickness of greater than 80 μm, there is a problem of cost increase, and the heat-fusing layer 142 causes deterioration in long-term durability of the vacuum heat insulator due to increase in an amount of external gas or water vapor coming through the heat-fusing layer.

In addition, the heat-fusing layer 142 may have a degree of crystallization of 30% or more, a softening point from 70° C. to 130° C., and a melting point from 100° C. to 170° C. If the heat-fusing layer 142 has a degree of crystallization of less than 30%, there can be a problem of deterioration in degree of inner vacuum due to deterioration in barrier properties of the shell since bonding strength between molecules can be easily weakened at high temperatures.

If the heat-fusing layer 142 has a softening point of less than 70° C., when the vacuum heat insulator is used at high temperatures, there is a problem of deterioration in barrier properties of the shell due to decreased bonding strength between molecules of the heat-fusing layer, and inner vacuum of the vacuum heat insulator can break due to leakage through the shell caused by shrinkage of the heat-fusing layer and the like. If the heat-fusing layer 142 has a softening point of greater than 130° C., there is a problem in that excess heat and pressure must be applied to seal the heat-fusing layer.

Further, if the heat-fusing layer 142 has a melting point of less than 100° C., inner vacuum of the vacuum heat insulator can break due to breakage of the heat-fusing layer caused by melting of the heat-fusing layer, and if the heat-fusing layer 142 has a melting point of greater than 170° C., there is a problem in that excess heat and pressure must be applied to seal the heat-fusing layer.

Protective Layer 146

The protective layer 146 absorbs and distributes external impact, and thus serves to protect a surface of the vacuum heat insulator and the core from external impact. Thus, the protective layer 146 may be formed of a material having excellent impact resistance.

The protective layer 146 may include polycarbonate, polyimide, nylon, and polyethylene terephthalate (PET) films. At least one selected from these films may be used as a stacked body. For example, the stacked body in which the nylon and PET films are bonded to each other may be used as the protective layer.

Each of the films may have a thickness of 12 μm to 25 μm. If the films have a thickness of less than 12 μm, the protective layer does not exhibit unique capabilities due to high possibility of breakage by external impact, scratches or the like, and if the films have a thickness of greater than 25 μm, there are drawbacks such as increase in manufacturing costs, deterioration in flexibility, and the like.

In addition, as shown in FIG. 3, the vacuum heat insulator may include an inorganic layer 200*b*, which includes aluminum (Al) or inorganic silica ($Si_2O_3$ and the like) and is formed on any one surface of the film in the protective layer 146.

The inorganic layer 200*b* may be added to improve impact resistance, heat resistance, cold resistance, scratch resistance, moisture barrier properties, gas barrier properties, and flexibility. In addition, the inorganic layer 200*b* has a thickness of 500 nm or less, preferably from 5 nm to 300 nm If the inorganic layer 200*b* has a thickness of less than 5 nm, the inorganic layer cannot properly exhibit barrier properties to gas, moisture or the like. Further, if the inorganic layer 200*b* has a thickness of greater than 300 nm, although the inorganic layer can sufficiently exhibit barrier properties, an excess of process costs is used for formation of the inorganic layer.

The inorganic layer 200*b* may be formed by deposition of aluminum (Al) or inorganic silica ($Si_2O_3$ and the like)

Barrier Layer 144

The barrier layer 144 is bonded to a lower side of the protective layer 146 and maintains inner vacuum while blocking inflow of external gas, moisture or the like.

According to the invention, the barrier layer 144 may include an aluminum (Al) foil exhibiting excellent barrier properties, and may include an aluminum foil containing 0.65 wt % or less of iron (Fe) among aluminum foils. If the aluminum foil includes greater than 0.65 wt % of iron (Fe), increase in manufacturing costs becomes much greater than improvement in barrier properties.

The aluminum foil may have a thickness of 6 μm to 12 μm. If the aluminum foil has a thickness of less than 6 μm, cracks or defects can be generated in a rolling process, and if the aluminum foil has a thickness of greater than 12 μm, heat insulation effects of the vacuum heat insulator can be deteriorated due to heat transfer along the aluminum foil exhibiting high thermal conductivity.

If the aluminum foil is torn, the vacuum heat insulator can be deteriorated in in long-term durability due to permeation of gas, moisture or the like through the torn region.

Thus, according to the invention, the protective layer in which the aluminum foil is bonded to a PET film or an ethylene vinyl alcohol (EVOH) film may be used to supplement barrier properties of the aluminum foil.

In addition, the vacuum heat insulator may include a PET film or an ethylene vinyl alcohol (EVOH) film, on which an inorganic layer 144*c* including aluminum or silica is formed.

The PET or EVOH film may have a thickness of 12 μm to 16 μm. If the film has a thickness of less than 12 μm, the film can suffer from defects or can be torn during formation thereof, and if the film has a thickness of greater than 16 μm, the vacuum heat insulator can suffer from deterioration in processability and increase in overall manufacturing costs thereof.

The inorganic layer 144*c* may be added to improve impact resistance, heat resistance, cold resistance, scratch resistance, moisture barrier properties, gas barrier properties, and flexibility. In addition, the inorganic layer 144*c* has a thickness of 500 nm or less, preferably from 5 nm to 300 nm If the inorganic layer 144*c* has a thickness of less than 5 nm, the inorganic layer cannot properly exhibit barrier properties to gas, moisture or the like. Further, if the inorganic layer 144*c* has a thickness of greater than 300 nm, although the inorganic layer can sufficiently exhibit barrier properties, an excess of process costs for formation of the inorganic layer 144*c* is used.

The inorganic layer 144*c* may be formed through deposition of aluminum (Al) or inorganic silica ($Si_2O_3$ and the like).

As shown in FIG. 4, the barrier layer 144 may include an EVOH film 144*b*, which has the inorganic layer 144*c* thereon and is placed on an inner side of the shell of the vacuum heat insulator and is bonded to the heat-fusing layer 142, and an aluminum foil 144*a*, which is placed on an outer side thereof and bonded to the protective layer 210.

In this structure, since the EVOH film 144*b* is provided to supplement barrier properties of the aluminum foil, the aluminum foil exhibiting much better barrier properties excluding an edge thereof than the EVOH film 144*b* is placed on the outer side of the shell to act as a barrier to gas, moisture or the like, and the EVOH film 144*b* acts as a barrier only to gas, moisture or the like permeating through the torn aluminum foil 144*a*.

Flame Retardant Layer 148

The flame retardant layer 148 serves to protect the vacuum heat insulator from external heat when the vacuum heat insulator is employed in high temperature conditions. The flame retardant layer 148 includes a flame retardant. The flame retardant layer 148 may be formed by coating the flame retardant onto the protective layer 146, or flame retardancy may be imparted by adding the flame retardant to the protective layer 146.

When the high temperature vacuum heat insulator is applied to electronic appliances operated at a relatively high temperature of 70° C. to 140° C., the shell can be damaged by smoke or heat. According to the invention, the shell 140 of the high temperature vacuum heat insulator includes the flame retardant layer 148, which includes the flame retardant and is formed therein, to solve such problems.

The flame retardant layer 148 includes the flame retardant to provide flame retardancy to the vacuum heat insulator. The flame retardant may be any material capable of imparting flame retardancy without limitation, and may include at least one selected from non-halogen type phosphorus compounds, nitrogen compounds, aluminum hydroxide, and antimony trioxide.

Here, the nitrogen compounds collectively refer to flame retardants including melamine, urea, amine, amide flame retardants, and the like. In addition, the phosphorus compounds collectively refer to phosphorus flame retardants including red phosphorus, phosphoric acid ester flame retardants, and the like. A synergistic effect of flame retardancy can be obtained by mixing the nitrogen compound with the phosphorus compound.

In addition, since the aluminum hydroxide exhibits low corrosiveness and excellent electric insulation properties, and also has economic advantages, the aluminum hydroxide may be used as the flame retardant according to the invention. Further, antimony trioxide can provide great improvement in flame retardancy when used together with other flame retardants.

The flame retardant layer 148 may be formed by coating a coating composition, which includes 10 wt% to 90 wt% of the flame retardant, and 10 wt% to 90 wt% of a polymeric resin and an organic solvent, onto a surface of the protective layer 146. Alternatively, the flame retardant layer 148 may be formed by coating the coating composition, which includes 5 wt% to 50 wt% of the phosphorus compound, 5 wt% to 50 wt% of the nitrogen compound and 40 wt% to 90 wt% of the polymeric resin and the organic solvent, onto an upper side of the protective layer 146. If the phosphorus compound is present in an amount of less than 5 wt%, or the nitrogen compound is present in an amount of less than 5 wt%, it is difficult for the flame retardant layer to secure sufficient flame retardancy. Further, if the phosphorus compound is present in an amount of greater than 50 wt%, or the nitrogen compound is present in an amount of greater than 50 wt%, it is difficult to form the flame retardant layer due to reduction in amounts of other materials excluding the flame retardant. The polymeric resin and the organic solvent may be present in a total amount of 40 wt% to 90 wt%. If the total amount of the polymeric resin and the organic solvent is less than 40 wt%, it is difficult to form the flame retardant layer, and if the total amount of the polymeric resin and the organic solvent is greater than 90 wt%, it is difficult for the flame retardant layer to secure flame retardancy.

The polymeric resin may include polyester, polyurethane polymeric resins, and the like. In addition, the organic solvent may include any organic solvent used in a general coating composition without limitation.

The flame retardant layer 148 may be formed by any coating method without limitation. Preferably, spray coating, roll coating, or gravure printing is used.

Further, although the flame retardant layer 148 may have any thickness, the flame retardant layer 148 may be required to have a certain range of thickness depending on requirements for properties of the prepared composite film, the tendency of thin filming of the vacuum heat insulator, and the like. Thus, the flame retardant layer 148 preferably has a thickness of 0.5 μm 10 μm.

Films forming the respective layers are bonded to each other via an adhesive layer (not shown).

Here, the composite film according to the invention may have an inter-layer bonding strength of 200 gf/15 mm or more when used as the shell of the vacuum heat insulator. If the composite film has an inter-layer bonding strength of less than 200 gf/15 mm, the composite film can suffer from delamination when applied to the shell of the vacuum heat insulator. Here, the adhesive which can be used for formation of the adhesive layer may include polyester, and polyurethane adhesives. In addition, these may be used alone or in combination thereof.

The invention claimed is:

1. A high temperature vacuum heat insulator comprising:

an inorganic core comprising glass fibers; and a shell comprising a composite film and sealing the inorganic core, wherein the composite film sequentially comprising a heat-fusing layer, a barrier layer, a protective layer and a flame retardant layer, wherein the heat-fusing layer brought into close contact with a surface of the inorganic core;

the protective layer for absorbing and distributing external impact; and the barrier layer for blocking permeation of gas or moisture and being located between the heat-fusing layer and the protective layer;

the flame retardant layer is formed by coating a composition onto an outer surface of the protective layer, the composition comprising a phosphorus compound, a nitrogen compound, and a polymeric resin and an organic solvent; and a thickness of the flame retardant layer is from 0.5 μm to 10 μm.

2. The high temperature vacuum heat insulator according to claim 1, wherein the composition comprising 10 wt % to 90 wt % the phosphorus compound and the nitrogen compound, and 10 wt % to 90 wt % of the polymeric resin and the organic solvent.

3. The high temperature vacuum heat insulator according to claim 1, wherein the composition comprising 5 wt % to 50 wt % of the phosphorus compound, 5 wt % to 50 wt % of the nitrogen compound and 40 wt % to 90 wt % of the polymeric resin and the organic solvent.

4. The high temperature vacuum heat insulator according to claim 1, wherein the inorganic core comprises at least one plate-shaped board stacked therein, the plate-shaped board being prepared from glass fibers by thermal compression of the glass fibers being subjected and stirred in water or an aqueous solution comprising an organic compound.

5. The high temperature vacuum heat insulator according to claim 1, wherein the inorganic core comprises at least one plate-shaped board stacked therein, the plate-shaped board comprising an inorganic binder comprising a glass fiber aggregate having a diameter of 1 μm to 10 μm, and silica.

6. The high temperature vacuum heat insulator according to claim 1, wherein the inorganic core comprises at least one plate-shaped mat stacked therein, the plate-shaped mat being prepared through needling treatment of glass wools.

7. The high temperature vacuum heat insulator according to claim 6, wherein the mat has a density of 100 $g/mm^3$ to 300 $g/mm^3$.

8. The high temperature vacuum heat insulator according to claim 1, further comprising: a getter inserted into an inner space sealed by the shell.

9. The high temperature vacuum heat insulator according to claim 8, wherein the getter comprises quicklime (CaO) powder having a purity of 95% or more.

10. The high temperature vacuum heat insulator according to claim 8, wherein the getter comprises at least one selected from among zeolite, cobalt, lithium, activated carbon, aluminum oxide, barium, calcium chloride, magnesium oxide, magnesium chloride, iron oxide, zinc, and zirconium.

11. The high temperature vacuum heat insulator according to claim 1, wherein the protective layer is formed by stacking at least one film, the each film having a thickness of 12 μm to 25 μm and being selected from among polycarbonate, polyimide, nylon and polyethylene terephthalate (PET) films.

12. The high temperature vacuum heat insulator according to claim 11, wherein the protective layer further comprises an inorganic layer having a thickness of 500 nm or less, and comprising aluminum or silica.

13. The high temperature vacuum heat insulator according to claim 1, wherein the barrier layer is formed by bonding an aluminum foil having a thickness of 6 μm to 12 μm to a PET or ethylene vinyl alcohol (EVOH) film having a thickness of 6 μm to 12 μm.

14. The high temperature vacuum heat insulator according to claim 13, wherein the barrier layer further comprises an inorganic layer comprising aluminum or silica.

15. The high temperature vacuum heat insulator according to claim 1, wherein the heat-fusing layer is formed of a film comprising at least one selected from linear low-density polyethylene (LLDPE), low density polyethylene (LDPE), high density polyethylene (HDPE), and cast polypropylene (CPP).

16. The high temperature vacuum heat insulator according to claim 15, wherein the heat-fusing layer has a degree of crystallization of 30% or more, a softening point from 70° C. to 130° C., and a melting point from 100° C. to 160° C.

17. The high temperature vacuum heat insulator according to claim 1, wherein the protective layer, the barrier layer and the heat-fusing layer are bonded to each other via a polyurethane or polyester resin, and the shell has an inter-layer bonding strength of 200 gf/15 mm or more.

18. The high temperature vacuum heat insulator according to claim 1, wherein the heat-fusing layer has a softening point from 70° C. to 130° C.

19. The high temperature vacuum heat insulator according to claim 1, wherein the heat-fusing layer has a degree of crystallization of 30% or more.

* * * * *